United States Patent Office 3,141,737
Patented July 21, 1964

3,141,737
METHOD FOR THE PREPARATION OF ALUMINUM NITRIDE REFRACTORY MATERIAL
Howard J. Bartlett, Niagara Falls, Ontario, and David T. Lapp and George Robert Watson, Chippawa, Ontario, Canada, assignors to Norton Company, Worcester, Mass., a corporation of Massachusetts
No Drawing. Filed June 4, 1962, Ser. No. 199,609
7 Claims. (Cl. 23—192)

This invention relates to the production of refractory materials. More particularly, this invention relates to the preparation of aluminum nitride refractory material.

Refractories primarily are materials which can withstand high temperatures. Their essential function is to serve as structural materials and thus their usefulness depends on the ability to maintain their mechanical function at these high temperatures. There is a constant search for new refractories which can fulfill special needs.

For example, better refractories are needed in the metal industry where molten metals such as aluminum are produced and handled. The physical forms of refractory materials which are required include bricks, plates, tubes, crucibles and other castable shapes. Many known refractories produced in these forms do not have a prolonged service life.

Aluminum nitride shows promise as a good refractory material but its production has been limited and costly. Most methods of preparation known heretofore have been for small quantities of high purity material which in general were made by employing vacuum techniques; hence the products have not been able to compete in the refractory field. Furthermore, the aluminum nitride produced has proven to be unstable, decomposing in moisture to release ammonia, and it has been considered unfeasible to prepare refractory ware from aluminum nitride without the inclusion of a binding material.

It is therefore an object of this invention to provide an economical method for the production of aluminum nitride refractory material.

It is another object of this invention to provide such a method which may be conducted in conventional apparatus without the need for specialized equipment.

It is still another object of this invention to provide an aluminum nitride refractory material suitable for the fabrication of various physical forms.

It is a further object of this invention to provide an aluminum nitride refractory material which is stable in the presence of moisture.

It is a still further object of this invention to provide an aluminum nitride refractory material which is especially suited for use in the metal industry with, for example, molten aluminum.

It is a further object of this invention to provide a method for making aluminum nitride of low carbon content and high purity.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has been found that these objects may be attained by heating together metallic aluminum and a cyanamide compound in the presence of nitrogen gas. The aluminum metal is preferably granular or coarse powder and of substantial purity.

The aluminum and cyanamide compound are thoroughly blended and heated at a temperature between 1100° C. and 1400° C. The preferred temperature is 1200° C. The reaction takes place quite rapidly with a retention time at temperature between 30 minutes and 90 minutes. Where highest purity of product is desired the longer retention time is employed. Nitrogen gas is passed through the furnace during the reaction and cooling stages.

Cyanamide may be employed as the solid source of nitrogen in our invention. However, it is preferable to use dicyandiamide, which is a dimer of cyanamide. It is also possible to employ melamine which is a trimer of cyanamide produced by heating cyanamide or dicyandiamide.

When a moisture stable product is desired, the product is fired, after the initial reaction, in an inert atmosphere such as argon at a temperature between 2050° C. and 2150° C.

The aluminum nitride product whether stabilized or unstabilized, may be hot pressed or cold pressed and sintered to a desired shape. It may be formed into refractory ware by itself or with other refractory materials such as titanium boride, boron carbide, and silicon carbide as additives.

Where the cyanamide compound employed is cyanamide, dicyandiamide, or melamine, we have found that as little as 7% by weight of the compound, based on the total weight of the mix, is adequate to produce a product of high quality and purity. Thus, in general, the cyanamide compound may contain as little as about 10% of the total nitrogen in the finished product, the remaining nitrogen being supplied by the nitrogen atmosphere maintained in the reaction zone.

At 1100° C. the reaction is slow and only partly reacted when the preferred time of 30 to 90 minutes at temperature is employed. Since good results are achieved at about 1200° C. and above, we pick 1200° C. as our preferred temperature.

EXAMPLE I 72 gms. of coarse aluminum metal plus 28 gms. of dicyandiamide were thoroughly blended and placed in a small graphite crucible and heated at 1200° C. for 60 minutes. Excess nitrogen was passed over the mix during the reaction and cooling stages.

The resulting cake was crushed to pass through a 100 mesh screen and a sample of this had the following analysis:

|  | Percent |
|---|---|
| Free carbon | 0.16 |
| Aluminum | 66.05 |
| Nitrogen | 32.20 |
| Total | 98.41 |

This product contains a calculated aluminum nitride content of 94.5% based on the nitrogen analysis.

EXAMPLE II

Two crucibles, each containing 108 gms. of coarse aluminum thoroughly blended with 42 gms. of dicyandiamide, were placed in a molding furnace and heated for 90 minutes at 1200° C. Throughout the run excess nitrogen was passed over the mix and during the cooling stage a nitrogen atmosphere was maintained.

The resulting cakes were crushed to pass through a 100 mesh screen and a composite sample of the two cakes was sent in for chemical analysis. The following is the result of this analysis:

|  | Percent |
|---|---|
| Free carbon | 0.16 |
| Aluminum | 68.66 |
| Nitrogen | 30.50 |
| Total | 99.32 |

This product contains a calculated aluminum nitride content of 89.4% based on the nitrogen analysis.

In the above examples coarse aluminum metal is referred to as a raw material. The chemical analysis of this material is: Aluminum—99.84%, iron—0.07%, silicon—0.08% and gallium—0.01%. The particle size distribution is as follows: 46% on 35 mesh, 45% on 65 mesh, 9% through 65 mesh.

In the further examples, listed in the following table, the effects of variations in temperature, time, and composition are apparent.

Table I

| No. | Composition | Temperature, °C. | Retention time (Min.) | Product Analysis |   |   |   |
|---|---|---|---|---|---|---|---|
|   |   |   |   | N, percent | Al, percent | Free C, percent | AlN,[1] percent |
| 3 | 93.3 gms. Aluminum / 6.7 gms. Dicyandiamide | 1,200 | 90 | 32.30 | 65.69 | 0.23 | 94.5 |
| 4 | 93.3 gms. Aluminum / 6.7 gms. Dicyandiamide | 1,200 | 30 | 31.47 | 67.13 | 0.08 | 92.1 |
| 5 | 28 gms. Aluminum / 22 gms. Dicyandiamide | 1,200 | 90 | 31.15 | 63.87 | 2.62 | 91.2 |
| 6 | 23 gms. Aluminum / 27 gms. Dicyandiamide | 1,200 | 90 | 31.44 | 65.17 | 0.83 | 92.0 |
| 7 | 504 gms. Aluminum / 196 gms. Dicyandiamide | 1,200 | 90 | 30.83 | 65.63 | 0.23 | 90.4 |
| 8 | 504 gms. Aluminum / 196 gms. Dicyandiamide | 1,100 | 90 | 25.58 | 60.07 | 0.10 | 74.9 |
| 9 | 420 gms. Aluminum / 330 gms. Dicyandiamide | 1,400 | 90 | 31.79 | 66.31 | 0.09 | 93.0 |

[1] The aluminum nitride percentage is calculated from the nitrogen analysis.

In the above examples nitrogen gas was passed, in excess, over the reactants to maintain a nitriding atmosphere.

Although it is possible to use over 50% by weight of the cyanamide compound, much smaller quantities are effective and no advantage is gained in using large excesses of the cyanamide compound.

We claim:

1. A method for the production of aluminum nitride which comprises forming a mixture of aluminum metal with a cyanamide compound, said cyanamide compound being present in an amount sufficient to supply at least about $\frac{1}{10}$ mole of nitrogen for each mole of aluminum in the mix, heating the mixture at a temperature above 1100° C. in an atmosphere of nitrogen, continuing the heating for a time effective to convert the aluminum to aluminum nitride, and cooling the product in a nitrogen atmosphere.

2. The method of claim 1 in which the mixture is heated at a temperature of 1200° C.

3. The method of claim 1 in which the mixture is heated, at reaction temperature, for from 30 to 90 minutes.

4. The method of claim 1 in which the cyanamide compound is cyanamide.

5. The method of claim 1 in which the cyanamide compound is dicyandiamide.

6. The method of claim 1 in which the cyanamide compound is melamine.

7. The method of claim 1 in which the product is thereafter fired at a temperature between about 2050° C. and 2150° C. in an inert atmosphere for a time effective to stabilize the aluminum nitride against reaction with moisture.

References Cited in the file of this patent

FOREIGN PATENTS

| 499,486 | France | Nov. 20, 1919 |
| 1,258,644 | France | Mar. 6, 1961 |